Figure 1:
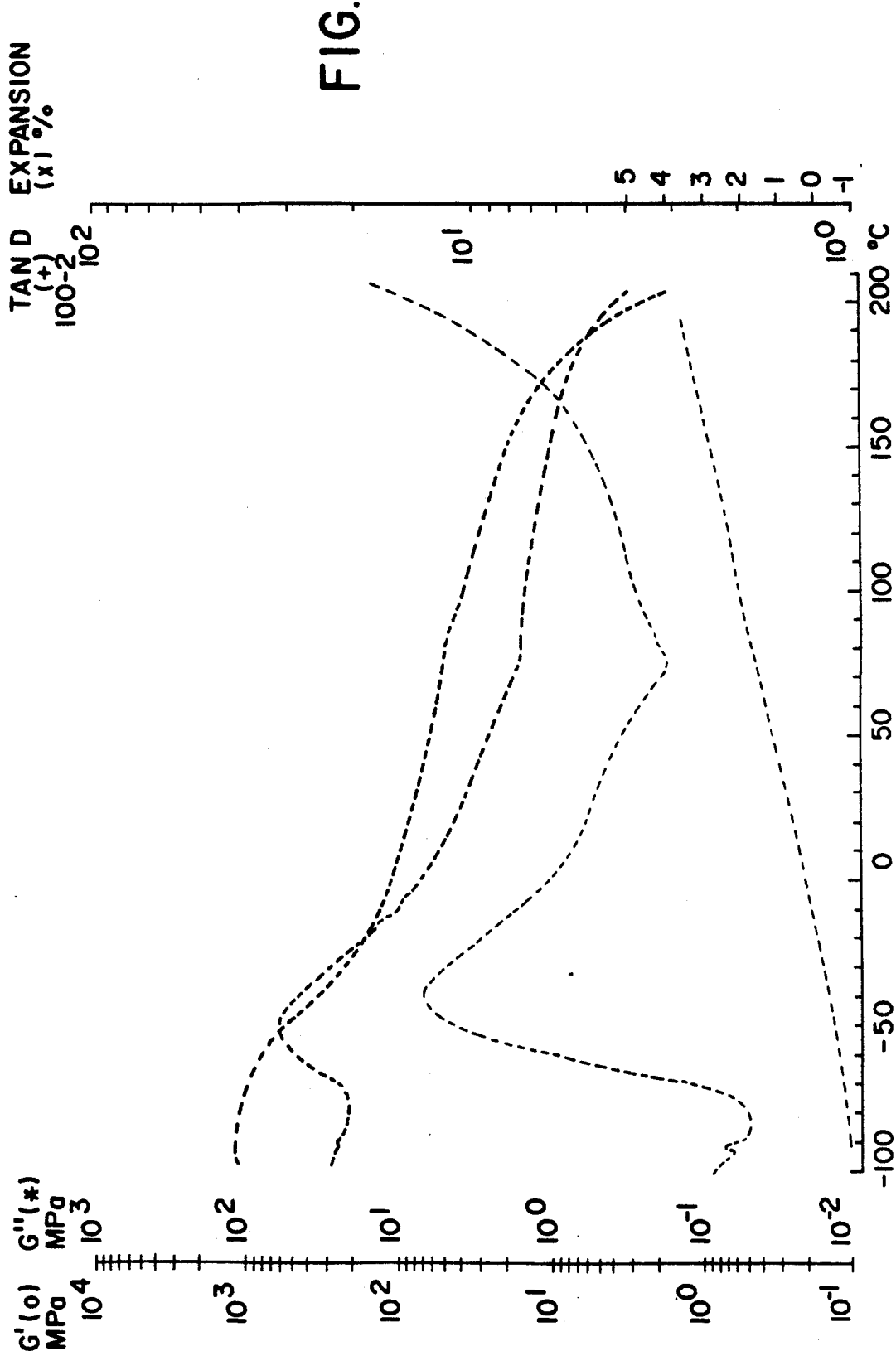

United States Patent [19]
Gaymans et al.

[11] Patent Number: 5,268,445
[45] Date of Patent: Dec. 7, 1993

[54] SEGMENTED COPOLYESTER AMIDES

[75] Inventors: Reinoud J. Gaymans, Enschede, Netherlands; Jeannette L. Haan, Unterföhring, Fed. Rep. of Germany

[73] Assignee: General Electric Company, Pittsfield, Mass.

[21] Appl. No.: 905,171

[22] Filed: Jun. 24, 1992

Related U.S. Application Data

[63] Continuation of Ser. No. 796,488, Nov. 22, 1991, abandoned.

[51] Int. Cl.$^5$ .............................................. C08L 77/12
[52] U.S. Cl. ................................. 528/272; 528/289; 528/297; 528/308.6; 525/10; 525/41; 525/42; 525/46; 525/165; 525/166; 525/178; 525/437; 525/438; 525/445
[58] Field of Search ............ 528/272, 289, 297, 308.6; 525/10, 41, 42, 46, 165, 166, 178, 437, 438, 445

[56] References Cited

U.S. PATENT DOCUMENTS

| | | | |
|---|---|---|---|
| 2,856,385 | 10/1958 | Van Den Berghe et al. | 528/292 |
| 4,100,116 | 7/1978 | Mazanek et al. | 521/167 |
| 4,346,214 | 8/1982 | Blount | 528/275 |
| 4,966,945 | 10/1990 | Drawert et al. | 525/113 |

OTHER PUBLICATIONS

Journal of Polymer Science, vol. 1, pp. 353–359 (1962) "Preparation of Regularly Alternating Polyesteramides", Williams et al.

Primary Examiner—John Kight, III
Assistant Examiner—Sam A. Acquah

[57] ABSTRACT

The invention relates to segmented copolyesteramides built up from units derived from one or more flexible segments, 1,4-butanediol, 1,4-butanediamine and terephthalic.

20 Claims, 4 Drawing Sheets

SEGMENTED COPOLYESTER AMIDES

This is a continuation of copending application Ser. No. 07/796,488 filed on Nov. 22, 1991, now abandoned.

The present invention relates to copolyester amide block copolymers based on flexible segments and non-flexible copolyester amide segments based on units originating from terephthalic acid, 1,4-butanediol and 1,4-butane diamine. The flexible segments are generally based on polyethers, polyesters, polybutadiene, hydrogenated polybutadiene, or polyisobutylene.

Such products are widely used on a large scale as thermoplastic elastomers, for example, in the motor-car industry.

Thermoplastic elastomers behave like elastomers at temperatures below the melting temperature, while above the said temperature a thermoplastic behaviour is found. As a result of this, the said products are easy to process; in many cases simpler than real elastomers which often couple their elastomeric behaviour with a difficult processibility.

In principle, thermoplastic elastomers consist of two types of blocks, namely soft or flexible blocks and hard or non-flexible blocks. The soft blocks are usually formed by amorphous flexible segments having a glass transition temperature below 0° C. The hard blocks consist of crystallisable segments having a high melting-temperature Polybutylene terephthalate (PBT) is a particularly interesting synthetic resin for making thermoplastic elastomers. Due to the structural regularity thereof it has a high crystallinity, which results in a modulus which is little temperature-dependent between the glass temperature and the melting temperature. Moreover it has a rapid crystallisation. A disadvantage of the said synthetic resin, however, is that the maximum application temperature is rather low.

It is the object of the invention to provide a modification of such thermoplastic elastomers based on PBT, having an increased application temperature.

The invention relates to copolyester amides which are built up from units originating from one of more flexible segments having a glass transition temperature of below 0° C. and units originating from 1,4-butanediol, 1,4-butanediamine and terephthalic acid.

The flexible segments preferably are linear and have a molecular weight of 200–4,000. These blocks constitute the soft segments of the copolyester amides according to the invention.

The hard segments are formed by the units originating from 1,4-butanediol, 1,4-butanediamine and terephthalic acid. It is to be preferred to start from a molar excess of diol with respect to diamine, because therewith very good properties are obtained.

In order to obtain a product having good properties it is essential for a good coupling to exist between the hard and the soft segments. This coupling may be obtained by the presence of functional groups in the flexible segment. For that purpose, the flexible segments having terminal hydroxyl groups, acid groups, amine groups or ester groups are generally best suitable. Notably, the difunctional compounds are to be preferred.

It has been now found surprisingly that the products according to the invention have such properties that the application temperature thereof is increased with respect to corresponding thermoplastic-elastomeric copolyester amides based on PBT. It is rather surprising that this is the case since it were to be expected that the incorporation of amide segments would lead to a deterioration of the properties of the thermoplastic elastomer.

In contrast with what is usual in the copolymerisation of various components, decrease of the application temperature does not or substantially not occur in the products according to the present invention. On the contrary, the segmented block copolymers according to the invention maintain their modulus level up to higher temperatures as compared with the corresponding polyesters having a comparable viscosity. As a result of this it is possible to maintain a much higher application temperature for the products according to the invention.

In itself it is possible to manufacture the copolyester amides with a 'random' distribution of the units originating from diol and diamine. It has been found, however, that with a more ordered distribution of the units originating from the diamine, a considerably better pattern of properties is obtained. For this reason it is to be preferred that the number of units originating from the diamine and present next to each other in the copolyester amide is not more than 15% of the overall number of amide units.

The major components of the copolyester amides according to the invention are units originating from 1,4-diaminobutane, 1,4-butanediol, flexible segment and terephthalic acid. However, it is also possible to replace a minor quantity of the components which form the hard segments by corresponding components. However, it is essential for the said components not to adversely influence the properties of the copolyester amides. In general, not more than 20 mol.% of each component should be replaced by another component. More in particular the said quantity is not more than 10 mol.%, preferably 0%.

The quantity of flexible segment is approximately 20–90% by weight related to the overall weight of the polymer.

The preparation of the copolyester amides according to the invention may be done in various manners.

According to a first modified embodiment it is done in a number of steps. A diester diamide is prepared in a first step by reaction of a diamine with an at least twofold molar quantity of diester of terephthalic acid, for example, the dimethyl terephthalate. This reaction takes place generally in the presence of a catalyst, for example, Li(OCH)3. The use of a catalyst is not necessary, but it generally promotes the course of the reaction positively. If the reaction is carried out starting from a mixture of all components which is brought in the reactor prior to the beginning of the reaction, a rather large excess of diester (400%) should be used to obtain an optimum product. It has been found surprisingly that it is also possible to prepare the product with a high yield using a small excess of diester (150%). It is also possible to start from the diamine and p-carboalkoxy benzoylchloride.

A mixture of the said diester-diamide, 1,4-butanediol, optionally terephthalic acid or a terephthalic acid derivative and the flexible segment is then condensed to form a prepolymer. This prepolymer may finally be postcondensed to form a copolyester amide having the desired properties.

For the prepolymerisation the conditions may be used for the preparation of copolyester amides known from literature, but it is to be preferred to perform the prepolymerisation for 15-60 minutes at a temperature of <225° C. at a pressure of ≧0.75 bar, and then to keep the temperature at a value ≧230° C., at a pressure of <0.1 bar for at least 20 minutes. More in particular, during the said second phase the temperature is first brought at a value between 220° and 300° C., at a pressure between 10 and 50 mbar, which conditions are maintained for 10-45 minutes, succeeded by 45-120 minutes at a temperature ≧220° C., at a pressure of ≦5 mbar.

The resulting prepolymer may optionally be postcondensed in the solid state at a temperature between 150° C. and a few degrees below the melting-point of the polymer, in the presence of an inert gas.

Another method of preparing the copolyester amides according to the invention comprises the submission of diol, diamine, flexible segment and dialkylterephthalate, terephthalic acid or modified terephthalate, succeeded by raising the temperature of the mixture to a value between 150° and 200° C. In this manner a prepolymer is obtained having a reasonable extent of ordering, which prepolymer may be postcondensed to form the desired molecular weight. However, the advantage is that the method may be carried out in one reactor without intermediate isolation and/or purification steps, which may have important practical advantages.

This second method may still be adapted by bringing a mixture of the diol, the flexible segment and the diester at the indicated reaction temperature and then gradually adding the diamine. In this manner the advantage of a one-reactor-method is maintained, while an excellent product is obtained.

By varying the ratio diester, diol, flexible segment and terephthalic acid derivative, copolyester amides may be obtained having different ratios between ester and amide groups and different build-in percentages of flexible segment.

In the above description the starting material for the preparation of the copolyester amide is terephthalic acid or a derivative thereof. This may include in principle any terephthalic acid derivatives suitable for this purpose, notably, the diesters of terephthalic acid with a splittable ester group, for example, a lower alkyl group($C_1$–$C_4$) In this connection it is noted finally that it is optionally also possible to start from a dicarboxylic acid other than terephthalic acid, for example, 2,5-naphthalene-dicarboxylic acid, provided the said dicarboxylic acid has the same structural properties in the copolyester amides according to the invention as terephthalic acid.

The flexible segment, as always indicated herein before, is formed by a, preferably difunctional, linear polymer having a molecular weight of 200-4,000. This polymer has rubber-like properties after incorporation in the copolyester amides according to the invention, which is expressed inter alia in the glass transition temperature thereof. This temperature should be <0° C. Suitable polymers are polyesters, for example, aliphatic polyesters and notably polyethers, preferably based on ethylene oxide, propylene oxide, butylene oxide, copolymers, or block copolymers of two or more of them, optionally hydrogenated polybutadiene and polyisobutylene.

The segmented block copolymers according to the invention may be processed in the manner conventionally used for thermoplastic elastomers, for example, by injection molding at a temperature above the melting-point thereof. The conventional additives may also be incorporated in the additives, for example, dyes, pigments, UV-stabilizers, thermal stabilizers, as well as fillers, for example, soot, silicic acid, clay or glass fibers. It is also possible to mix the products according to the invention with one or more other synthetic resins.

The invention will now be described in greater detail with reference to a few examples, which serve to illustrate the invention but not to limit it.

EXAMPLES

A number of products according to the invention were prepared by starting from a general method one embodiment of which will be described in detail hereinafter.

Preparation diester-diamide a1. 5 g (0.06 Mol) of 1,4-diaminobutane, 111 g (0.6 Mol) of dimethyl terephthalate (400% excess), 106 ml of dry methanol and 395 ml of dry toluene were combined in a 1 liter three-necked flask with nitrogen inlet, reflux cooler and top stirrer. 9.5 ml Of 1.89M Li(OCH3) in methanol were added to this mixture. The mixture was refluxed (65°-70° C.) while stirring thoroughly. A white precipitate slowly formed in the initially bright solution after 1 hour. The mixture was kept at the reflux temperature for 40 hours, after which the precipitate was filtered off. The filtered product was then dispersed in boiling toluene and again filtered off (warm). This procedure was repeated. The product was then dispersed in boiling methanol, filtered warm and dried. The yield was 96-98%. The reaction product had a melting-point of 257° C. and a melting heat of 144 J/g.

a2. 35.9 g (0.408 Mol) of 1,4-diaminobutane, 400 g (2.041 Mol) of dimethyl terephthalate (excess), 425 ml of dry methanol and 1600 ml of dry toluene were combined in a 4 lifer three-necked flask with nitrogen inlet, reflux cooler and top stirrer. 20 ml Of 1.89M Li(OCH3) in methanol were added to this mixture. The mixture was refluxed (65°-70° C.) while stirring thoroughly. A white precipitate slowly formed after 1 hour in the initially bright solution. The mixture was maintained at the reflux temperature for 40 hours, after which the precipitate was filtered off. The filtered product was then dispersed in boiling toluene and again filtered off (warm). This procedure was repeated. The product was then dispersed in boiling methanol, filtered warm and dried. The yield was 88-93%. The properties were comparable with those of the product obtained according to a1.

Prepolymerisation b. The diester diamide according to a1 (24.3 mMol), dimethyl terephthalate (48.7 mMol), 1,4-butanediol, polytetramethylene oxide with a molecular weight of 700 (PTMO-700) and catalyst solution (0,4ml:1.48g of tetraisopropyltitanate and 0.1 g of Na in 30 ml of distilled n-butanol) were reacted at 150° C. for 30 minutes in a 250 ml-flask with nitrogen inlet and a mechanical stirrer. The molar ratio of the various components was such that a 25 mol % excess quantity of hydroxyl-functional group was present. The temperature was then raised to 250° C. and a vacuum of 10-15 mm Hg was applied for 30 minutes. The pressure was then reduced to 0.1-0.01 mm Hg, while maintaining the temperature at 250° C. These conditions were maintained for 1 hour.

Postcondensation d. The material obtained sub c was ground and postcondensed in the solid state at a temperature of 180° C. under nitrogen for 24 hours.

In this manner a number of products could be obtained having different contents of hard segments. These products were compared with polyether esters obtained in a comparable manner, but, of course, without the use of diester diamide.

In the Figures the torsion damping curves of four polymers are given, measured at 1 Hz and a heating rate of 1.8° C. per minute. G' represents the "shear modulus-'and G" the "loss modulus".

FIG. 1 relates to a segmented block copolymer obtained according to the mode of preparation described hereinbefore with a PTMO-700 content of 35% by weight. The equivalent ratio ester:amide in the polyether ester amide was 3:1.

Figure 2:
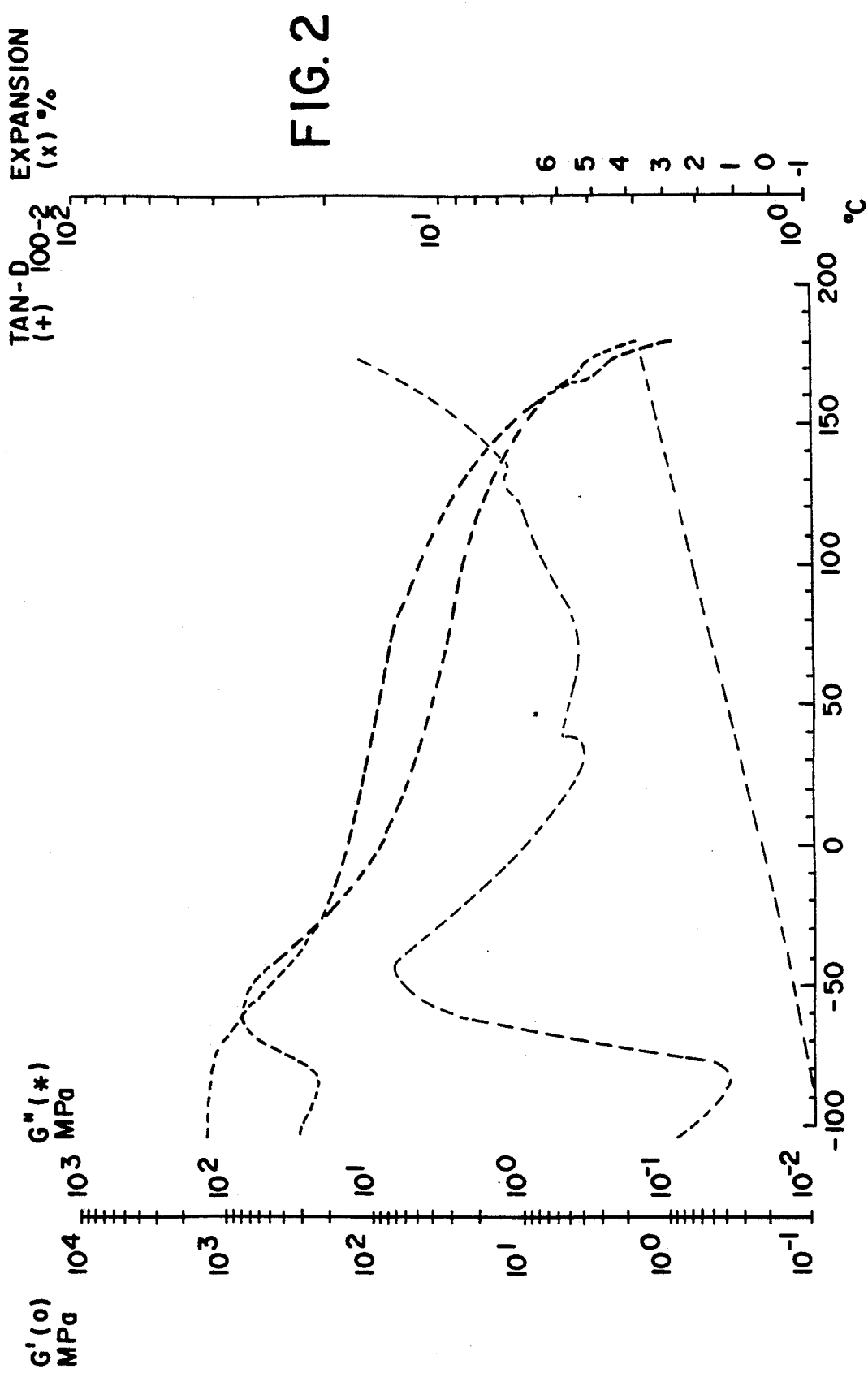

FIG. 2 relates to a segmented block copolymer based on PTMO-700/PBT. The PTMO-content was 35% by weight.

Figure 3:
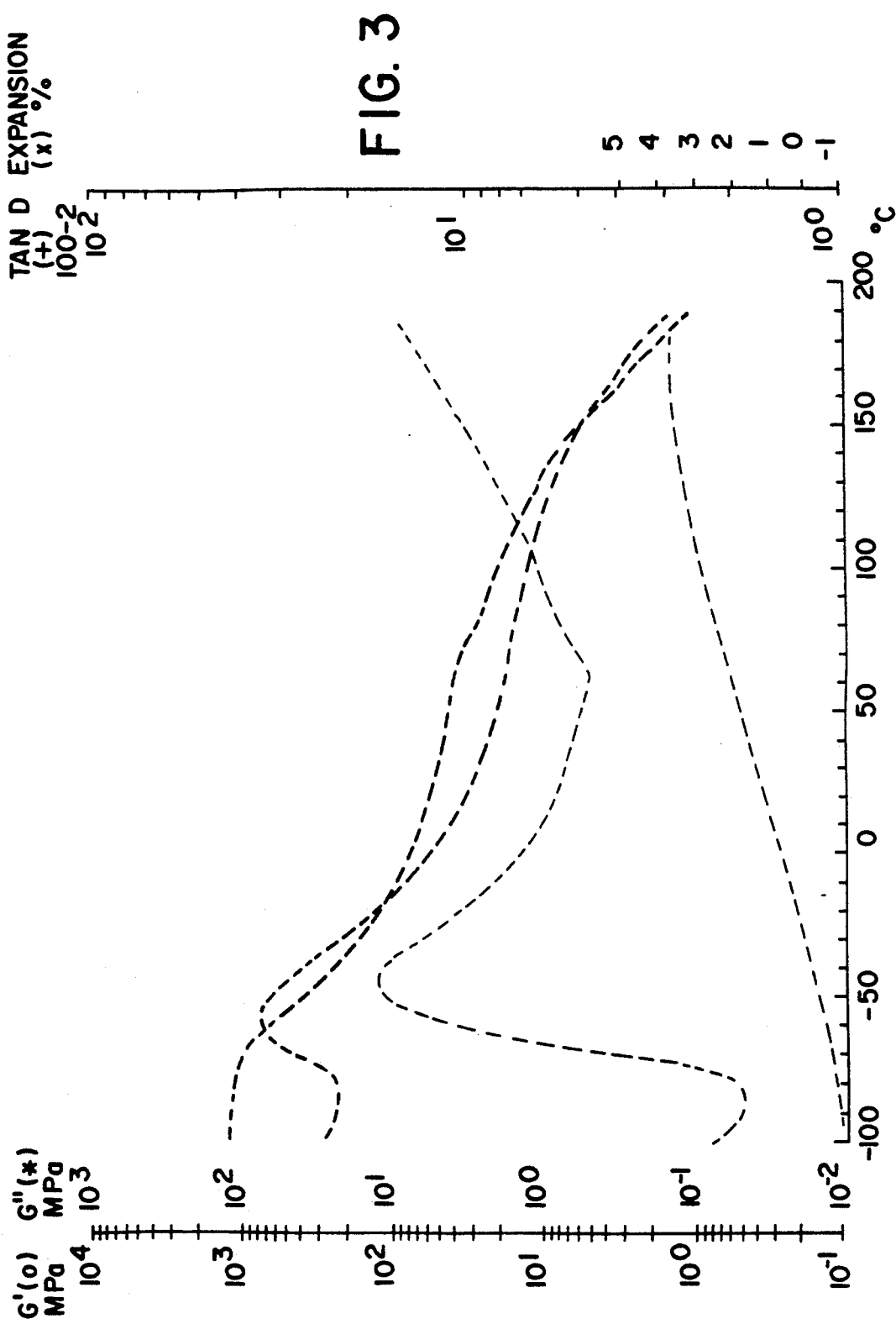

FIG. 3 relates to a segmented block copolymer obtained according to the mode of preparation described hereinbefore with a PTMO-700 content of 50% by weight. The equivalent ratio ester:amide in the polyether ester amide was 3:1.

Figure 4:
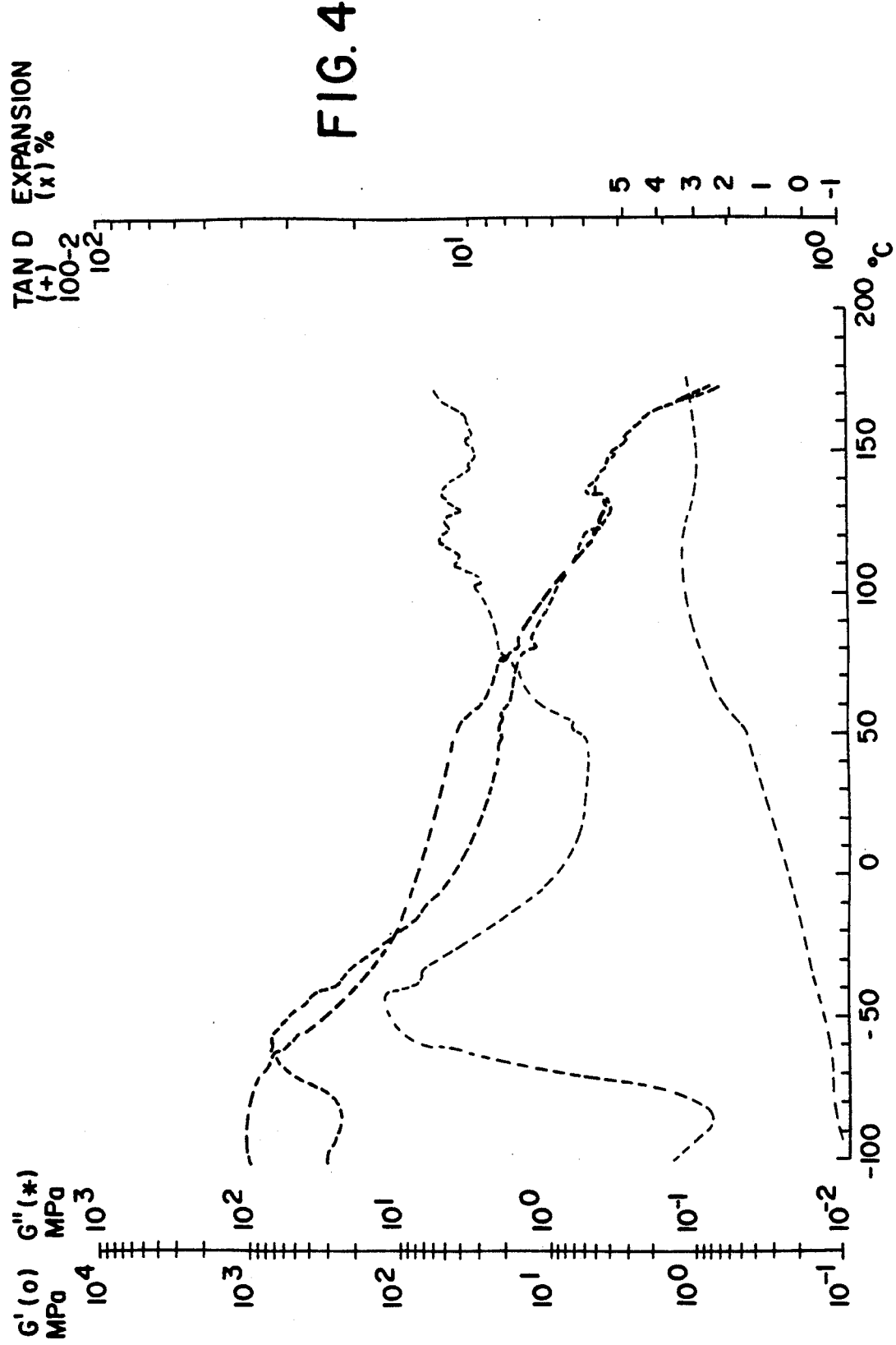

FIG. 4 relates to a segmented block copolymer based on PTMO-700/PBT. The PTMO content was 50% by weight.

From these Figures it appears that the maximum application temperature of the products according to the invention is raised with respect to the corresponding polyether ester.

We claim:

1. A segmented copolyester amide derived from units originating from one or more flexible segments selected from polyether, polyester, polybutadiene, hydrogenated polybutadiene, or polyisobutylene, having a glass transition temperature <0° C. and units originating from 1,4-butanediol, 1,4-butanediamine and terephthalic acid.

2. A copolyester amide as claimed in claim 1, wherein the content of flexible segments is between 20 and 90% by weight related to the overall weight of the copolyester amide.

3. A copolymer amide as claimed in claim 2, wherein the polyether is selected from the polyetherpolyols, amine-terminated polyethers, acid-terminated polyethers and ester-terminated polyethers.

4. A copolyester amide as claimed in claim 3, wherein the polyether is a polyether obtained from ethylene oxide, propylene oxide, butylene oxide, copolymers, or block copolymers of two or more thereof.

5. A copolyester amide as claimed in claim 2, wherein the polyester is an aliphatic polyester.

6. Process for the preparation of a segmented copolyester amide wherein a diol, a diamine, a flexible segment and a dialkylterephthalate or a terephthalic acid or a terephthalate derivative are reacted together in one reactor.

7. Process according to claim 6 wherein the diol, the flexible segment and the dialkyl terephthalate or the terephthalic acid or the terephthalate derivative are heated together in one reactor, and thereafter the diamine is gradually added.

8. Copolyester amide as claimed in claim 2, wherein the flexible segment comprises at least one unit originating from a polyether, polyester, polybutadiene, hydrogenated polybutadiene, or polyisobutylene.

9. A copolyester amide as claimed in claim 8, wherein the polyether is selected from the polyetherpolyols, amine-terminated polyethers, acid-terminated polyethers and ester-terminated polyethers.

10. A copolyester amide as claimed in claim 9, wherein the polyether is a polyether obtained from ethylene oxide, propylene oxide, butylene oxide, copolymers, or block copolymers of two or more thereof.

11. A copolyester amide as claimed in claim 8, wherein the polyester is an aliphatic polyester.

12. A method of improving the processibility of flexible polymers of polyether, polyester, polybutadiene, hydrogenated polybutadiene or polyisobutylene having a glass transition temperature less than 0° C., comprising forming a segmented copolyester amide block copolymer from one or more of the flexible polymers and units originating from 1,4-butanediol, 1,4-butanediamine and a dialkylterephthalate or a terephthalic acid or a terephthalate derivative, the units of 1,4-butanediol, 1,4-butanediamine and dialkylterephthalate or a terephthalic acid or a terephthalate derivative forming a hard segment in the segmented copolyester amide block copolymer.

13. A method according to claim 12, wherein the content of flexible segments is between 20 and 90% by weight related to the overall weight of the copolyester amide.

14. A method according to claim 12, wherein the polyether is selected from the polyetherpolyols, amine-terminated polyethers, acid-terminated polyethers and ester-terminated polyethers.

15. A method according to claim 14, wherein the polyether is a polyether obtained from ethylene oxide, propylene oxide, butylene oxide, copolymers, or block copolymers of two or more thereof.

16. A method according to claim 12, wherein the polyester is an aliphatic polyester.

17. A method according to claim 12, wherein the flexible polymer is based on a polymeric chain having terminal hydroxyl groups, acid groups, amine groups or ester groups.

18. A method according to claim 12, wherein the diol, the diamine, the flexible polymer and the dialkylterephthalate or the terephthalic acid or the terephthalate derivative are reacted together in one reactor.

19. A method according to claim 18, wherein the diol, the flexible polymer and the dialkyl terephthalate or the terephthalic acid or the terephthalate derivative are mixed and heated together in one reactor followed by the gradual addition of the diamine.

20. A copolyester amide as claimed in claims 2, 3, 4, 5, 8, 9, 10 or 11, wherein the flexible segment is based on a polymeric chain having terminal hydroxyl groups, acid groups, amine groups or ester groups.

* * * * *